United States Patent [19]

Townsend

[11] Patent Number: 5,238,442
[45] Date of Patent: Aug. 24, 1993

[54] METHOD AND MEANS FOR APPLYING LIQUID TO THE INTERIOR OF A CASING ON A SAUSAGE ENCASING MACHINE

[75] Inventor: Ray T. Townsend, Des Moines, Iowa

[73] Assignee: Townsend Engineering Company, Des Moines, Iowa

[21] Appl. No.: 904,663

[22] Filed: Jun. 26, 1992

[51] Int. Cl.⁵ .............................................. A22C 11/10
[52] U.S. Cl. ........................................ 452/27; 452/47
[58] Field of Search ...................... 452/27, 46, 47, 48

[56] References Cited

U.S. PATENT DOCUMENTS

| Re. 28,281 | 12/1974 | Bridgeford | 452/27 |
|---|---|---|---|
| 2,575,467 | 11/1951 | Reichel et al. | 452/47 |
| 4,026,985 | 5/1977 | Rasmussen | 452/27 |
| 4,905,587 | 3/1990 | Smithers | 452/35 |
| 4,949,430 | 8/1990 | Stanek | 452/45 |
| 4,958,412 | 9/1990 | Stanek | 452/38 |

Primary Examiner—Willis Little
Attorney, Agent, or Firm—Zarley, McKee, Thomte, Voorhees & Sease

[57] ABSTRACT

A method for introducing liquid smoke or the like to the interior surface of a stuffed sausage made on a sausage stuffing machine involves placing a liquid on at least a portion of the exterior surface of a stuffing horn of such machine, placing an enclosed casing on the stuffing horn, and simultaneously moving the casing towards an open end of the stuffing horn and extruding meat emulsion from the stuffing horn into the casing whereby the liquid will be deposited on the interior surface of the casing before the meat emulsion is extruded into the casing. An apparatus for applying liquid to the interior of a casing or a sausage encasing machine as an elongated hollow stuffing horn having an inlet end, an outlet end and an exterior surface. A pump is connected to the stuffing horn for moving meat emulsion through the stuffing horn in a direction towards the outlet end. An elongated groove appears in the exterior surface of the stuffing horn. An elongated tube is in that groove and is connected to a source of liquid smoke. The outlet end of the tube terminates in an annular groove in the exterior surface of the stuffing horn to expose the liquid to the interior surface of an enclosed casing on the stuffing horn.

20 Claims, 2 Drawing Sheets

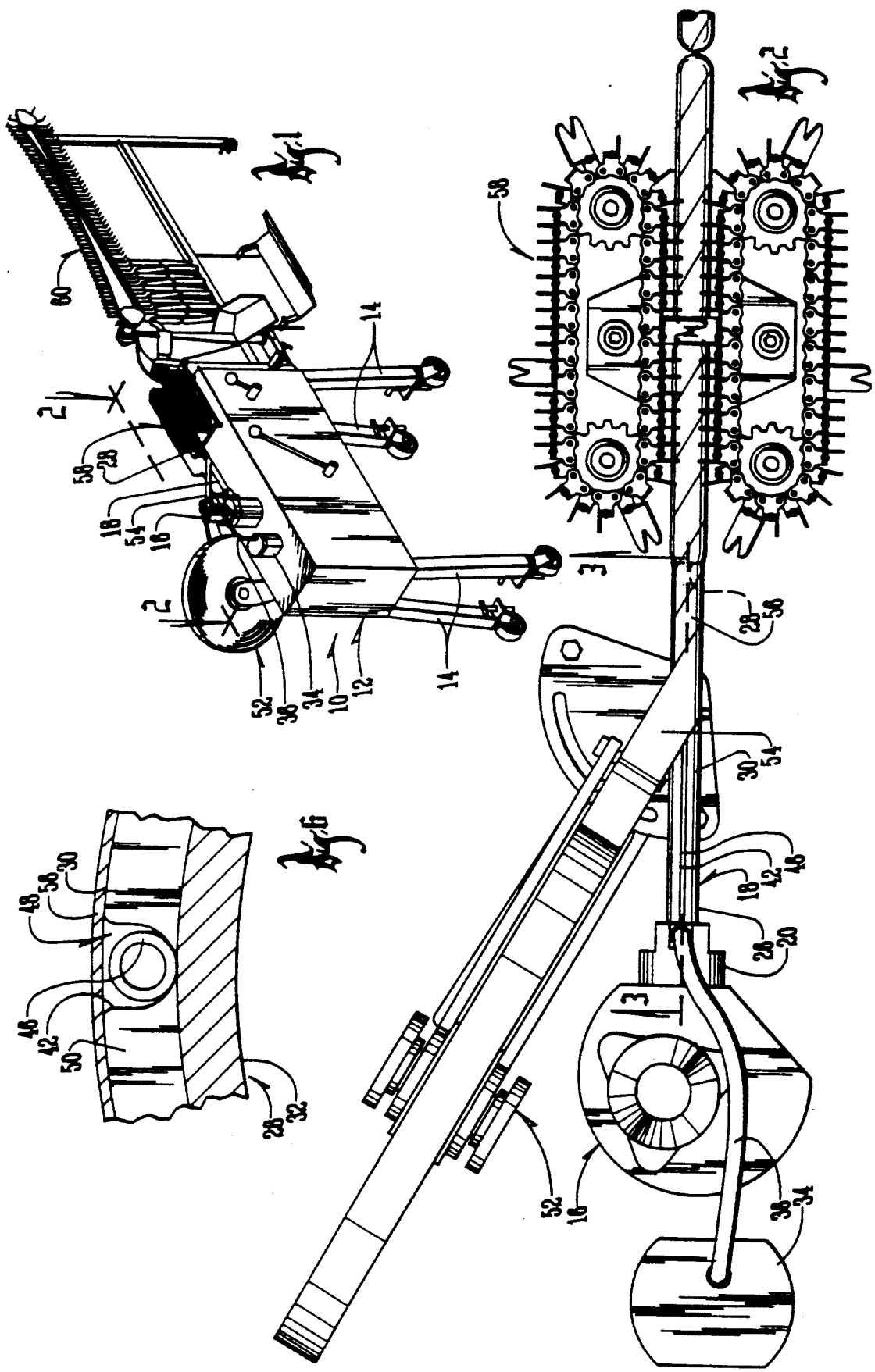

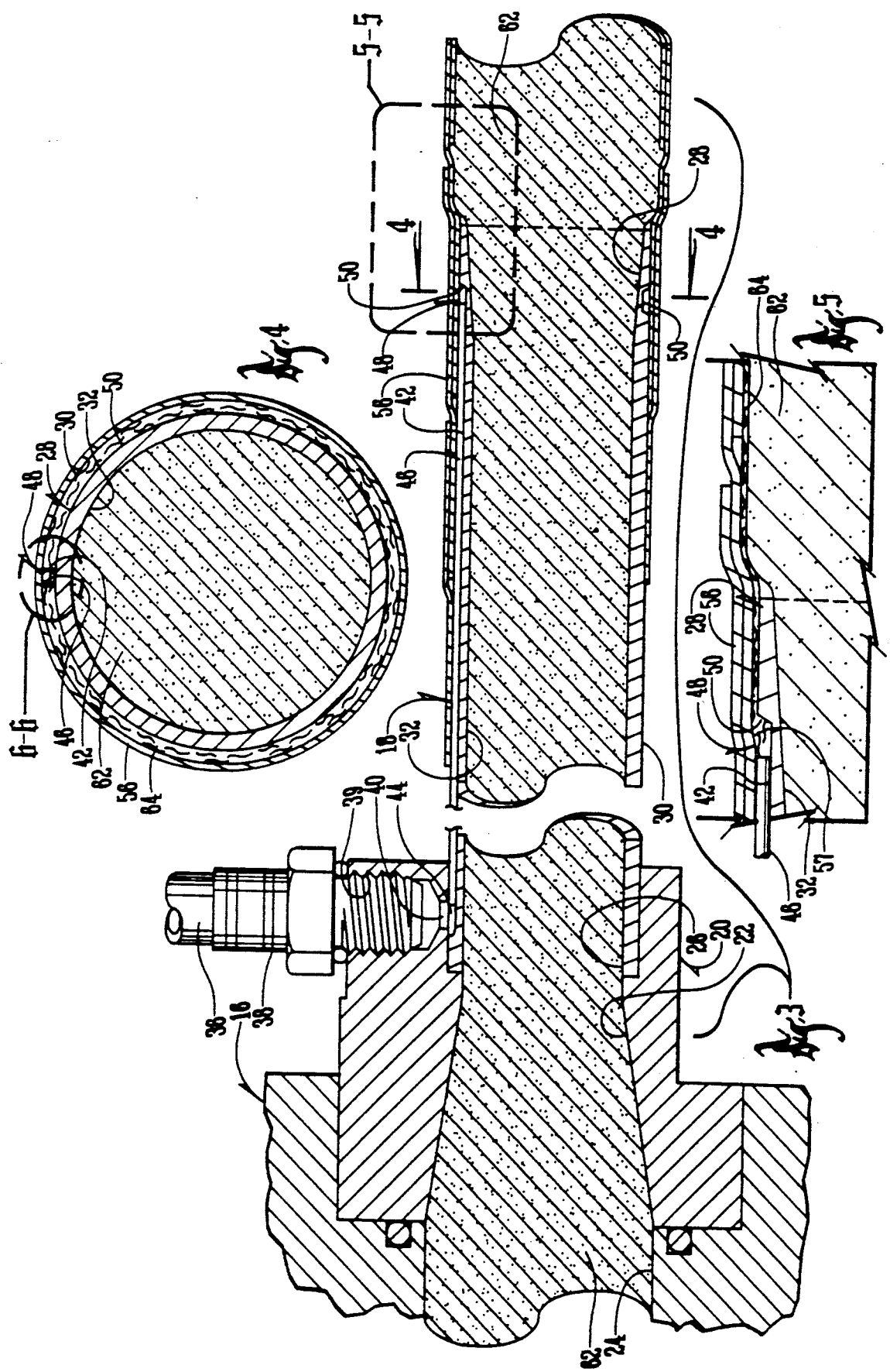

5,238,442

METHOD AND MEANS FOR APPLYING LIQUID TO THE INTERIOR OF A CASING ON A SAUSAGE ENCASING MACHINE

BACKGROUND OF THE INVENTION

Efforts have been made in the past to introduce liquid smoke and other liquid materials onto the surface of meat emulsion to enhance its taste, assist in the surface conditioning of the extruded meat emulsion, or to lubricate the emulsion as it moves through a stuffing horn towards the interior of an elongated closed casing. See U.S. Pat. No. 3,922,364.

The shortcomings of these prior devices and methods are that the liquid cannot be uniformly applied to the entire surface of the extruded meat product, and that the liquid material penetrates the meat emulsion and becomes partially intermixed therewith without staying on the exterior surface thereof.

It is therefore a principal object of this invention to provide a method and means for placing a liquid film on the exterior surface of an extruded meat emulsion product.

A further object of this invention is to provide a method and means for placing a liquid film on the exterior surface of an extruded meat emulsion product and which will take place through placing a liquid film on the interior of the casing before the meat emulsion is placed in the casing.

A still further object of this invention is to provide a method and means for placing a liquid film on the exterior surface of an extruded meat emulsion product after a casing has been formed on a stuffing horn through which the meat emulsion product is extruded.

These and other objects will be apparent to those skilled in the art.

SUMMARY OF THE INVENTION

The method of this invention for introducing liquid smoke or the like to the interior surface of a stuffed sausage made on a sausage stuffing machine involves placing a liquid on at least a portion of the exterior surface of a stuffing horn of such machine, placing an enclosed casing on the stuffing horn, and simultaneously moving the casing towards an open end of the stuffing horn and extruding meat emulsion from the stuffing horn into the casing whereby the liquid will be deposited on the interior surface of the casing before the meat emulsion is extruded into the casing.

The apparatus of the invention includes an elongated hollow stuffing horn having an inlet end, an outlet end and an exterior surface. A pump device is connected to the stuffing horn for moving meat emulsion through the stuffing horn in a direction towards the outlet end. An elongated groove appears in the exterior surface of the stuffing horn. An elongated tube is in that groove and is connected to a source of liquid smoke or the like. The outlet end of the tube terminates in an annular groove in the exterior surface of the stuffing horn to expose the liquid to the interior surface of an enclosed casing on the stuffing horn.

BRIEF DESCRIPTION OF THE DRAWINGS

FIG. 1 a perspective view of the machine of this invention;

FIG. 2 is a partial top plan view at an enlarged scale taken on line 2—2 of FIG. 1;

FIG. 3 is an enlarged scale longitudinal sectional view taken through the meat emulsion pump and the stuffing horn;

FIG. 4 is an enlarged scale sectional view taken on line 4—4 of FIG. 3;

FIG. 5 is an enlarged scale sectional view taken in the area of line 5—5 of FIG. 3; and FIG. 6 is a partial enlarged scale sectional view taken in the area of line 6—6 of FIG. 4.

DESCRIPTION OF THE PREFERRED EMBODIMENT

The meat stuffing machine 10 has a frame body 12 with four supporting legs 14. A conventional meat emulsion pump 16 connected to a source of meat emulsion (not shown) is mounted on the top of machine 10 immediately upstream of meat stuffing horn 18. As best shown in FIGS. 2 and 3, meat emulsion pump 16 has a block 20 having a meat emulsion bore 22 into which the upstream end of stuffing horn 18 is rigidly fixed. Bore 22 registers with bore 24 of pump 16. The numeral 26 designates the inlet end of stuffing horn 18; 28 is the outlet end thereof; 30 is the exterior surface thereof; and 32 is the interior surface (FIG. 5) thereof.

With reference to FIG. 2, a liquid pump 34 for pumping liquid smoke or the like is mounted on the top of machine 10 and is connected by conduit 36 to threaded fitting 38 which is mounted in a threaded bore 39 of block 20 (FIG. 3). Bore 39 has an outlet 40 immediately adjacent an elongated groove 42 (FIGS. 2 and 6) which is milled in the exterior surface 30 of stuffing horn 18. Groove 42 has an inlet end 44 (FIG. 3). An elongated liquid conduit tube 46 is mounted within groove 42. Groove 42 may be used without tube 46 if an oil based liquid smoke is used to permit such liquid to also lubricate the exterior surface of horn 18. The downstream end of tube 46 terminates at the outlet end 48 of groove 42 and further communicates with an annular groove 50 (FIG. 3) that is milled in the outer surface of the stuffing horn 18. Groove 42 and/or tube 46 could be located within horn 18.

A casing ribbon dispensing unit 52 (FIGS. 1 and 2) is mounted on machine 10 in any convenient manner and is adapted to dispense casing ribbon 54 to create a spiral casing 56. The spirally formed casing is created in accordance with the teachings of applicant's U.S. Pat. No. 4,727,625. The teachings of those patents insofar as the creation of the casing are incorporated hereby by reference. Essentially, the spiral casing 56 is created by causing the side edges of ribbon 54 to be frictionally secured to the adjacent side edges of a helix of the casing whereby a continuous casing member is created on the outer surface of the stuffing horn 18. Casing 56 has an interior surface 57 as shown in FIG. 5.

A conventional linking mechanism 58 is mounted on machine 10 and is adapted to twist the filled casing as will be described hereafter to create a plurality of links which are discharged from the linking mechanism onto conveyor 60 in conventional fashion.

The numeral 62 designates a meat emulsion and the numeral 64 in FIG. 5 designates the liquid film which is first deposited on the interior surface 57 of the casing 56 and then maintains that relative position as the casing is filled thereafter.

The normal operation of this invention requires that ribbon 54 be manually wound around the exterior surface 30 of stuffing horn 18 so that a portion thereof extends beyond the outlet end 28 of stuffing horn 18.

Typically, the outward end of the casing is then tied in a closed condition so that when meat emulsion begins to enter, the casing will be slidably moved on the exterior surface of the stuffing horn 18 and additional convolutions of ribbon 54 will be wound on the exterior surface of the stuffing horn 18 to create a continuous hollow casing.

At the same time, the liquid pump 34 is energized in any convenient manner to force a flow of liquid smoke or the like to conduit 36, fitting 38, the inlet end 44 of groove 42, and thence into elongated tube 46. The fluid is then conveyed through the tube 46 to the outlet end of groove 48 and into annular groove 50. As the completed casing 56 slides over annular groove 50, as will be discussed hereafter, the interior surface 57 of the casing 56 wipes across the liquid filled annular groove 50 to receive the liquid film 64 shown in FIG. 5.

Simultaneously with the foregoing, meat emulsion 62 is conventionally pumped by emulsion pump 16 so that the meat emulsion 64 flows through the bores 24 and 22 into the inlet end 26 of stuffing horn 18. As the meat emulsion leaves the outlet end 28 of the stuffing horn and engages the closed end of the casing 56, the casing 56 is pulled longitudinally outwardly from the outlet end 28 towards the linking mechanism 58. As this process continues, the casing 56 is continuously filled with meat emulsion, but the interior surface 57 of the casing 56 always carries a film of liquid 64 before the meat emulsion actually comes into contact with the casing.

As a result of this structure and method, the liquid smoke exists on the exterior surface of the meat emulsion and does not become intermixed with the meat emulsion as with prior devices.

It is therefore seen that this invention will achieve at least its stated objectives.

I claim:

1. A method of introducing a liquid inside the casing of a stuffed sausage made on a sausage stuffing machine having an elongated stuffing horn through which meat emulsion is extruded from an open end thereof, comprising,
   placing said liquid on at least a portion of the exterior surface of said stuffing horn,
   placing an enclosed casing on said stuffing horn, and simultaneously moving said casing towards and beyond said open end of said stuffing horn and extruding meat emulsion from said stuffing horn into said casing whereby said liquid will be deposited on the interior surface of said casing before said meat emulsion is extruded into said casing.

2. The method of claim 1 wherein said casing is formed on said stuffing horn by winding a strip of elongated casing material in helical fashion on the exterior surface of said stuffing horn.

3. The method of claim 2 wherein said casing is formed on said stuffing horn at a location upstream of the location of said liquid on the exterior surface of said stuffing horn.

4. The method of claim 3 wherein said liquid is moved in a closed conduit on said stuffing horn from a first inlet location upstream of the location where said casing is formed to an outlet position downstream from where said casing is formed.

5. The method of claim 1 wherein said liquid extends around the periphery of the outside surface of said stuffing horn to expose the entire interior surface of said casing to contact with said liquid.

6. The method of claim 4 wherein said liquid extends around the periphery of the outside surface of said stuffing horn to expose the entire interior surface of said casing to contact with said liquid.

7. The method of claim 1 wherein said casing is formed on said stuffing horn by placing elongated stripping means of elongated casing material on the exterior surface of said stuffing horn.

8. A sausage stuffing machine, comprising,
   an elongated hollow stuffing horn having an inlet end, an outlet end, and an exterior surface,
   pump means connected to said stuffing horn for moving meat emulsion through said stuffing horn in a direction towards said outlet end,
   first means on said machine for placing a liquid on at least a portion of the exterior surface of said stuffing horn to expose said liquid to the interior surface of an enclosed casing on said stuffing horn,
   second means provided on said machine for forming an enclosed casing on said stuffing horn upstream of the location on the exterior surface of said stuffing horn where said liquid is placed on said stuffing horn by said first means.

9. The machine of claim 8 wherein said first means includes a conduit on said stuffing horn extending from an inlet location upstream of the location where said casing is formed to an outlet position downstream from where said casing is formed.

10. The machine of claim 9 wherein said outlet position is comprised of an annular groove extending substantially around the exterior surface of said stuffing horn.

11. The machine of claim 8 wherein said second means comprises apparatus means for forming said casing by winding a strip of elongated casing material in helical fashion on the exterior surface of said stuffing horn.

12. The machine of claim 11 wherein said second means is positioned on said machine to form said casing on said stuffing horn upstream of the location on the exterior surface of said stuffing horn where said liquid is placed on said stuffing horn by said first means.

13. The method of claim 8 wherein said second means comprises apparatus means for forming said casing by placing stripping means of elongated casing material on the exterior surface of said stuffing horn.

14. A sausage stuffing machine, comprising,
   first means on said machine for imposing a liquid film on the interior surface of an elongated closed tubular casing, and
   second means in said machine for extruding a quantity of meat emulsion into said casing so that said liquid film can be transferred from said casing to the exterior surface of said meat emulsion within said casing,
   said second means comprising an elongated meat stuffing horn having an elongated liquid conduit on its exterior surface terminating in an annular groove on said stuffing horn.

15. The device of claim 14 wherein said conduit is a tube dwelling within an elongated groove on said stuffing horn, with said tube terminating in a discharge end at said annular groove.

16. The device of claim 14 wherein said second means comprises an elongated meat stuffing horn having an exterior surface which has substantially the same diameter as said interior surface of said tubular casing.

17. A method of introducing a liquid film inside the casing of a stuffed sausage, comprising,
taking an elongated hollow casing having an interior surface,
placing a liquid film on said interior surface,
thence filling said causing with a meat emulsion,
slidably moving said casing over a meat emulsion stuffing horn while said liquid film is placed on the interior surface of said casing, and
said casing being formed on said stuffing horn by placing a stripping means of elongated casing material on the exterior surface of said stuffing horn.

18. A sausage stuffing machine, comprising,
an elongated hollow stuffing horn, having an inlet end, an outlet end, and an exterior surface,
pump means connected to said stuffing horn for moving meat emulsion through said stuffing horn in a direction towards said outlet end,
first means on said machine for placing a liquid on at least a portion of the exterior surface of said stuffing horn to expose said liquid to the interior surface of an enclosed casing on said stuffing horn,
second means provided on said machine for forming an enclosed casing on said stuffing horn upstream of the location on the exterior surface of said stuffing horn where said liquid is placed on said stuffing horn by said first means,
said second means comprises apparatus means for forming said casing by winding a strip of elongated casing material in helical fashion on the exterior surface of said stuffing horn,
said first means includes a conduit on said stuffing horn extending from an inlet location upstream of the locatio where said casing is formed to an outlet position downstream from where said casing is formed, and
said conduit comprising an open elongated groove.

19. A sausage stuffing machine, comprising,
an elongated hollow stuffing horn having an inlet end, an outlet end, and an exterior surface,
pump means connected to said stuffing horn for moving meat emulsion through said stuffing horn in a direction towards said outlet end,
first means on said machine for placing a liquid on at least a portion of the exterior surface of said stuffing horn to expose said liquid to the interior surface of an enclosed casing on said stuffing horn,
second means provided on said machine for forming an enclosed casing on said stuffing horn upstream of the location on the exterior surface of said stuffing horn where said liquid is placed on said stuffing horn by said first means,
said second means comprises apparatus means for forming said casing by winding a strip of elongated casing material in helical fashion on the exterior surface of said stuffing horn,
said first means includes a conduit on said stuffing horn extending from an inlet location upstream of the locatio where said casing is formed to an outlet position downstream from where said casing is formed.

20. The machine of claim 19 wherein said outlet position is comprised of an annular groove extending substantially around the exterior surface of said stuffing horn.

* * * * *